United States Patent [19]

Schaefer

[11] Patent Number: 4,745,704
[45] Date of Patent: May 24, 1988

[54] PORTABLE STORAGE RECEPTACLE

[76] Inventor: Lawrence J. Schaefer, 41 Black Oak La., Fenton, Mo. 63026

[21] Appl. No.: 35,877

[22] Filed: Apr. 8, 1987

[51] Int. Cl.⁴ .............................................. A01K 97/04
[52] U.S. Cl. .................................... 43/54.1; 297/192; 312/266
[58] Field of Search ............................... 43/54.1, 57.1; 206/315.11, 349, 372; 224/920; 312/D33, 266; 297/192

[56] References Cited

U.S. PATENT DOCUMENTS

| | | | |
|---|---|---|---|
| 2,819,938 | 1/1958 | Zerver | 312/DIG. 33 X |
| 2,832,659 | 4/1958 | Akers | 312/266 |
| 3,047,349 | 7/1962 | Powell | 43/54.1 X |
| 3,188,157 | 6/1965 | Rand | 43/54.1 X |
| 3,947,991 | 4/1976 | Morcom | 43/54.1 |
| 4,119,044 | 10/1978 | Hines | 312/DIG. 33 X |
| 4,372,605 | 2/1983 | Cervantes | 297/192 |
| 4,378,882 | 4/1983 | Miller | 312/DIG. 33 X |
| 4,549,664 | 10/1985 | Gowan et al. | 312/308 X |

FOREIGN PATENT DOCUMENTS 157182 12/1956 Switzerland ................ 312/DIG. 33

*Primary Examiner*—Nicholas P. Godici
*Assistant Examiner*—Carmine Cuda
*Attorney, Agent, or Firm*—Rogers, Howell, Moore & Haferkamp

[57] ABSTRACT

A portable storage receptacle having at least one articulated top section, a non-articulated section, and a tubular passage through the non-articulated section for mounting the receptacle on a seat support member to minimize movement of the receptacle within a transportation vehicle.

10 Claims, 2 Drawing Sheets

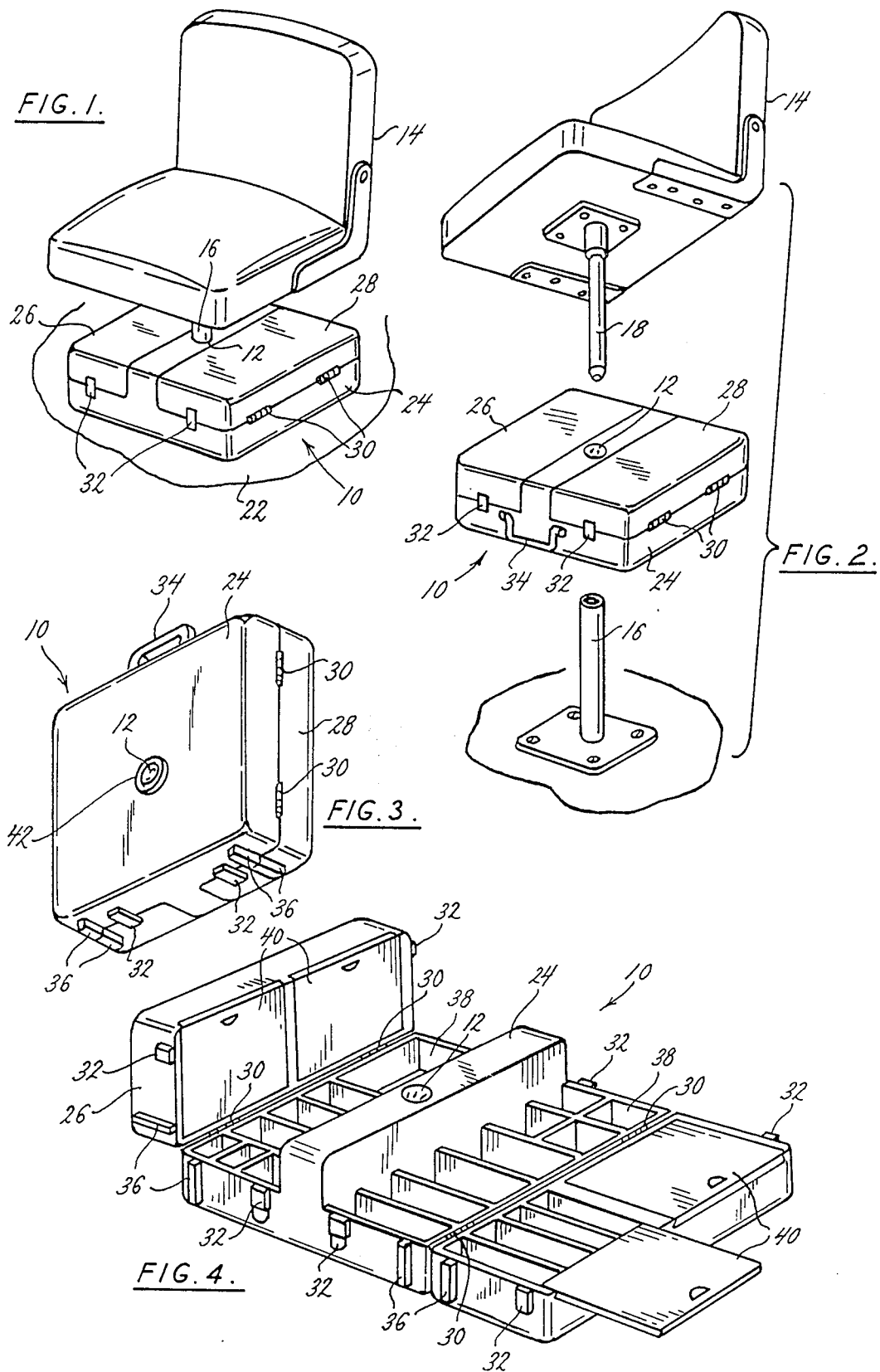

PORTABLE STORAGE RECEPTACLE

BACKGROUND OF THE INVENTION

This invention relates to a portable storage receptacle mountable around a vertical seat support member of a vehicle. Particularly, the invention relates to a fishing tackle box mountable around a vertical support of a seat on a fishing boat.

It is well known that some vehicles, such as fishing boats, are equipped with removable seats. The seats may be removed to provide extra storage or cargo space. To remove the seat from a fishing boat for example, the fisherman lifts the seat from an upright seat support and stores it in some other location.

In the past, individuals would place the portable storage receptacle on the floor or deck of the vehicle when either using or storing the receptacle. This arrangement left the receptacle in a vulnerable position where the individual could kick it over emptying the contents or possibly knock it out of the vehicle while the vehicle was in motion, thereby losing the receptacle and its contents.

The present invention is distinctive over prior portable storage receptacles by providing an opening or passageway which extends through the receptacle allowing the receptacle to be mounted on the seat support member of a seat. When an individual enters or boards the vehicle, the seat is removed from the seat support member. The receptacle is positioned so that the passageway and seat support member are engaged. Once the receptacle is in place, the individual replaces the seat back into the seat support member. The receptacle is securely mounted on the seat support member with movement of the receptacle being minimized, thereby reducing the likelihood of the receptacle being upset or lost.

To retrofit existing receptacles a mounting frame may be used to securely mount the receptacle on the seat support member, in accordance with a second embodiment of the present invention. The mounting frame comprises a rectangular frame and a V-shaped bracket connected to one side of the rectangular frame. The rectangular frame has a lip which extends around the bottom perimeter of the rectangular frame. To use the mounting frame the user removes the seat from the seat support member and places the V-shaped bracket over the seat receiving post. The receptacle is then mounted onto the lip and the seat is reinserted into the seat support member. The receptacle may be rotated about the seat for access to any of its storage compartments.

SUMMARY OF THE INVENTION

A portable storage receptacle having a bottom side and a top side is provided with a passageway through the receptacle. The receptacle is mounted on the seat support member of a seat in a transportation vehicle. The user slips the receptacle on to the seat support member through the passageway. Engagement of the receptacle and the seat minimizes movement of the receptacle in both the horizontal and vertrical directions. When the receptacle is engaged with the seat, the receptacle may be rotated to retrieve articles that are stored within the receptacle.

A plurality of flexible finger-like elements extend radially inwardly from the passageway. The flexible finger-like elements also extend from the bottom of the passageway to its top. The flexible finger-like elements allow the receptacle to be securely mounted on seat support members of various sizes. With the receptacle mounted on the seat support member movement in the horizontal direction is minimized and noise from the receptacle contacting the seat support member is reduced.

Connected to the passageway and the bottom of the receptacle is a flange which suitably spaces the receptacle off the floor or deck of the vehicle. The flange also facilitates rotating the receptacle about the seat support member.

To retrofit existing receptacles, a mounting frame is provided. As shown, the mounting frame is rectangular in shape and has a lip which extends around the entire bottom interior perimeter of the frame, although any shape corresponding to the shape of the receptacle is suitable. Attached to one side of the frame is a V-shaped bracket. This bracket allows the frame to be rotatably mounted on the seat support member of a seat in a transportation vehicle. Once the frame has been mounted on the seat support member, the receptacle can be set on the lip of the frame.

One advantage of the present invention therefore is that it provides a receptacle that can be securely mounted on the seat support member of a seat in a transportation vehicle for ease of operation and use. Additionally, the receptacle is safely mounted in the vehicle for minimized movement in both the vertical and horizontal directions. Risk of loss or damage to the storage receptacle is reduced by mounting the receptacle on the seat support member.

BRIEF DESCRIPTION OF THE DRAWINGS

FIG. 1 is a perspective view of the tackle box in a mounted position;

FIG. 2 is an exploded perspective view showing the tackle box in a mounted position;

FIG. 3 is a perspective view illustrating the bottom of the tackle box;

FIG. 4 is a perspective view of the interior of the tackle box opened for access to various compartments therein;

DETAILED DESCRIPTION OF THE PREFERRED EMBODIMENT

Figure 5:
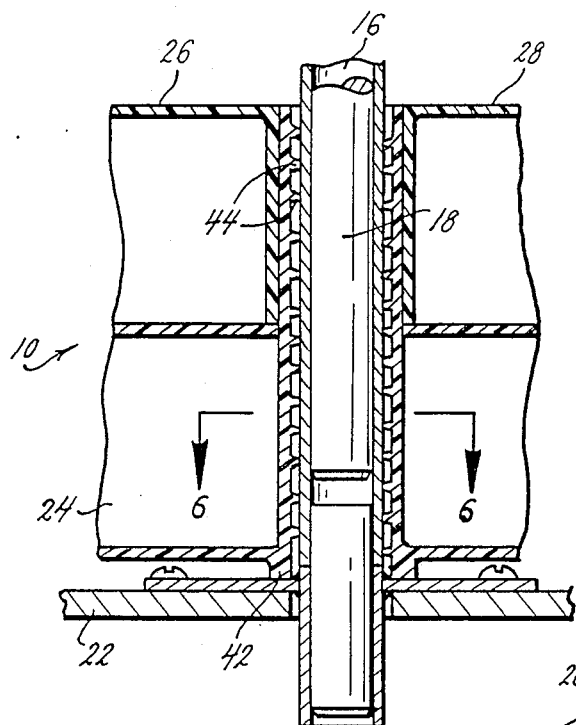
FIG. 5 is a partial vertical cross sectional view of the tackle box in a mounted position illustrating a force fit engagement of the flexible finger elements with the seat support.

In the drawings a tackle box is illustrated as the portable storage receptacle of this invention. This is for illustration only and it is not intended that the invention be limited to tackle boxes.

The tackle box of this invention is generally indicated as 10 in the figures. As shown in FIG. 1, tackle box 10 is securely mounted on the seat support member 16 of a seat 14, as for example in a fishing boat. Tackle box 10 has at least one articulated top section 26 and in the case of FIG. 1 a second articulated top section 28. Articulated top sections 26 and 28 are attached to a non-articulated section 24 by hinges 30 and held closed by latches 32.

FIG. 2 shows the tackle box mounted on the seat support member 16 in an exploded view. Seat support member 16 is bolted or otherwise secured to the deck 22 of a fishing boat. A tubular passage or passageway 12 extends through the non-articulated section 24 of tackle box 10. Tackle box 10 is mounted through the tubular passage 12 onto the seat support member 16. Occasionally, in some boats, seat support member 16 will extend only part way through the tubular passage 12. Seat 14, which is attached to and supported by a vertically extending shaft 18, is inserted into the seat support member 16. With seat 14 and vertically extending shaft 18 inserted into seat support member 16, the seat 14 can be rotated. When tackle box 10 is mounted on seat support member 16 tackle box 10 can be rotated to access any of the items stored in the tackle box. A handle 34 may be attached to the non-articulated section 24 for carrying the tackle box 10 when it is not mounted.

As shown in FIG. 3, tackle box 10 may have a flange 42 which extends outwardly from the tubular passage 12 and the bottom of the non-articulated section 24. The flange spaces tackle box 10 off the deck 22 and facilitates rotating the tackle box 10. Tackle box 10 also may have legs 36 which allow tackle box 10 to be erected in an upright position when it is not mounted.

FIG. 4 shows the interior of tackle box 10. In the interior are various compartments 38 for storing items such as tackle and the like. The interior also has sliding doors 40 which insure that items stored in the compartments 38 will remain there.

FIG. 5 shows a detailed cross sectional view of tubular passage 12. A plurality of flexible finger-like elements 44 extend radially inwardly from tubular passage 12. The finger-like elements 44 also span the interior of tubular passage 12. Finger-like elements 44 allow tackle box 10 to be securely mounted on seat support members of various circumferences. Movement in the horizontal direction is minimized and noise from the tackle box striking the seat support member is suppressed.

Figure 6:
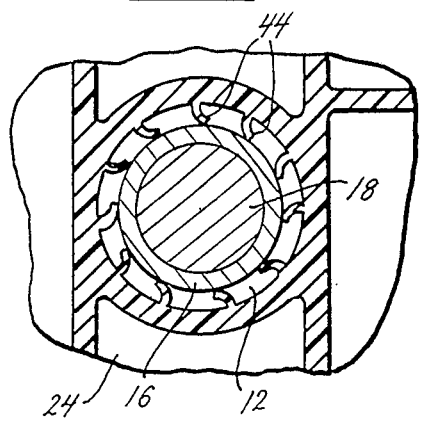
FIG. 6 is a horizontal sectional view taken approximately along line 6—6 of FIG. 5.

As shown in FIG. 6, tackle box 10 is securely mounted on seat support member 16. FIG. 6 also shows flexible finger-like elements 44 flexing to securely hold the tackle box 10 to the seat support member 16.

Figure 7:
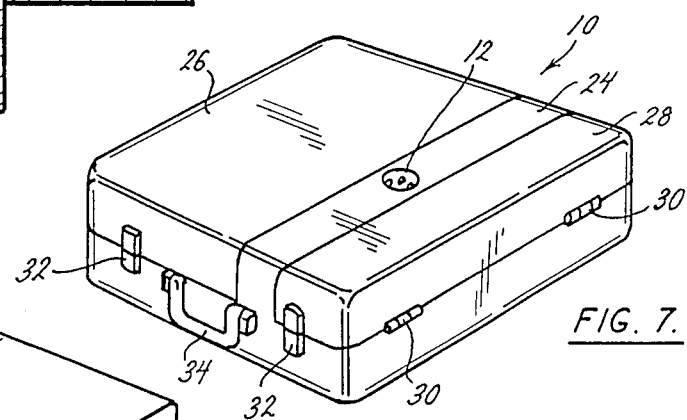
FIG. 7 is a perspective view of another embodiment of the tackle box of this invention.

FIG. 7 shows another embodiment of the tackle box of this invention. Sometimes the seat support member of a fishing seat is located next to a ledge or some other obstruction making it impractical to mount the tackle box of this invention. The solution to this problem is to offset the non-articulated section 24 from the center of the tackle box 10. With the non-articulated section off centered it is now possible to mount the tackle box 10 on the seat support member 16. Rotation of the tackle box 10 is minimized in this situation.

Figure 8:
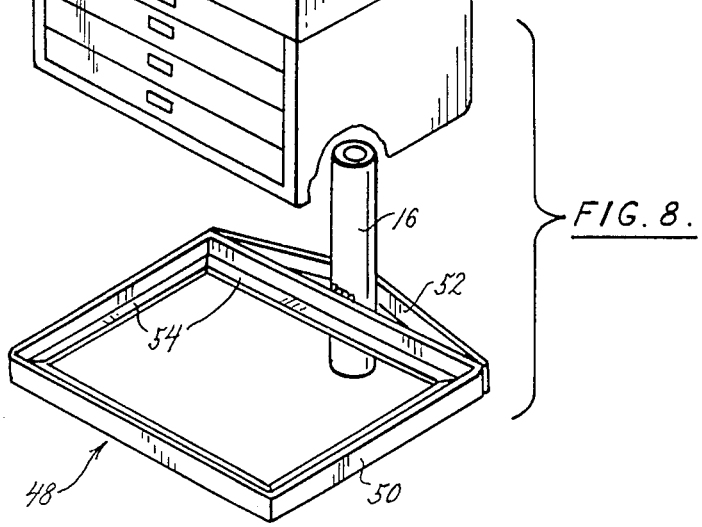
FIG. 8 is a perspective view of yet another embodiment of the tackle box of this invention.

An old tackle box 46, as shown in FIG. 8, may be retrofitted to be securely mounted on seat support member 16 by using mounting frame 48. Mounting frame 48 comprises a rectangular receiving frame 50. Rectangular receiving frame 50 has a lip 54 which extends around the bottom interior perimeter of frame 50. Connected to the side of frame 50 is a V-shaped bracket 52. V-shaped bracket 52 is mounted on seat support member 16 and then tackle box 46 is set in place on lip 54 of frame 50.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A portable storage receptacle having a bottom side and a top side, means defining a passageway through the receptacle and providing communication between the bottom side and the top side for freely rotatable engagement with a seat support member to minimize lateral movement of the receptacle within a transportation vehicle and to facilitate rotation of the receptacle around the seat support member independent of the rotation of the seat support member and a flange which extends outwardly from the bottom of the passageway and receptacle which rotates with the receptacle and facilitates rotation of the receptacle around the seat support member.

2. The device of claim 1 wherein the means defining a passageway through the receptacle further comprises a plurality of flexible finger-like elements that extend radially inward from the passageway and extend at least part way between the bottom side and the top side of the receptacle.

3. The device of claim 1 wherein the means defining a passageway through the receptacle is located at the center of the top side and the center of the bottom side.

4. A fishing boat seat tackle box assembly comprising:
a compartmented tackle box having at least one articulated top section and a non-articulated section;
a tubular passage providing communication through the non-articulated section;
an upright seat support securely mounted to the deck of a boat and extending at least part way in close fit engagement within the tubular passage;
a flange which extends outwardly from the bottom of the passage and the non-articulated section which rotates with the box and facilitates rotation of the tackle box around the seat support;
a seat mounted on a vertically extending shaft, the shaft being rotatable when supported by the seat support;
whereby the horizontal movement of the tackle box is minimized, tubular passage facilitates rotation of the tackle box around the seat support independent of the rotation of the seat or the shaft, and the tackle box and seat are quickly removable from the boat.

5. The device of claim 4 wherein the tubular passage comprises a plurality of flexible finger-like elements extending radially inwardly from the passage.

6. The device of claim 4 wherein the non-articulated section is located at the center of the tackle box.

7. The device of claim 4 wherein the tubular passage is located at the center of the non-articulated section.

8. A fishing boat seat tackle box assembly comprising:
a compartmented tackle box having at least one articulated top section and a non-articulated section which is offset from the center of the tackle box;
a tubular passage providing communication through the non-articulated section;
an upright seat support securely mounted to the deck of a boat and extending at least part way in close fit engagement within the tubular passage;
a flange which is located at the bottom of the passage and extends outwardly from the non-articulated section which rotates with the box and facilitates rotation of the tackle box around the seat support;

a seat mounted on a vertically extending shaft, the shaft being rotatable when supported by the seat support;

whereby the horizontal movement of the tackle box is minimized, tubular passage facilitates rotation of the tackle box around the seat support independent of the rotation of the seat or the shaft, and the tackle box and seat are quickly removable from the boat.

9. The device of claim 8 wherein the tubular passage comprises a plurality of flexible finger-like elements extending radially inwardly from the passage and extending from the top to the bottom of the passage.

10. The device of claim 8 wherein the tubular passage is located at the center of the non-articulated section.

* * * * *